US008646070B1

(12) United States Patent
Patsenker et al.

(10) Patent No.: US 8,646,070 B1
(45) Date of Patent: Feb. 4, 2014

(54) VERIFYING AUTHENTICITY IN DATA STORAGE MANAGEMENT SYSTEMS (75) Inventors: Svetlana Patsenker, Wayland, MA (US); Benjamin Thrift, Reston, VA (US); Boris Farizon, Westborough, MA (US); Mordechai Zvi Zur, Newton, MA (US); Sylvia Martin, Shrewsbury, MA (US); Jeffrey B. Lee, Ashburn, VA (US); Nigel B. Hislop, Springfield, VA (US); Eric Baize, Sudbury, MA (US)

(73) Assignee: EMC Corporation, Hopkinton, MA (US)

( * ) Notice: Subject to any disclaimer, the term of this patent is extended or adjusted under 35 U.S.C. 154(b) by 1880 days.

(21) Appl. No.: 11/171,906

(22) Filed: Jun. 30, 2005

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC ............................................. 726/22; 726/26

(58) Field of Classification Search
None
See application file for complete search history.

(56) References Cited

U.S. PATENT DOCUMENTS

| | | | |
|---|---|---|---|
| 6,574,617 B1* | 6/2003 | Immerman et al. | 1/1 |
| 6,976,053 B1* | 12/2005 | Tripp et al. | 709/202 |
| 7,131,143 B1* | 10/2006 | LaMacchia et al. | 726/30 |
| 7,194,623 B1* | 3/2007 | Proudler et al. | 713/164 |
| 7,356,705 B2* | 4/2008 | Ting | 713/186 |
| 7,398,389 B2* | 7/2008 | Teal et al. | 713/164 |
| 7,430,594 B2* | 9/2008 | Krupczak | 709/223 |
| 7,779,469 B2* | 8/2010 | Hopen et al. | 726/22 |
| 2001/0037311 A1* | 11/2001 | McCoy et al. | 705/65 |
| 2002/0078380 A1* | 6/2002 | Lin et al. | 713/201 |
| 2002/0078382 A1* | 6/2002 | Sheikh et al. | 713/201 |
| 2003/0028363 A1* | 2/2003 | Nobili et al. | 704/1 |
| 2004/0205772 A1* | 10/2004 | Uszok et al. | 719/317 |

* cited by examiner

*Primary Examiner* — Nadia Khoshnoodi
(74) *Attorney, Agent, or Firm* — Krishnendu Gupta; Jason A. Reyes; Deepika Bhayana (57) ABSTRACT

A storage area network management application operates using agents for management of resources. Authenticity is verified in installing an agent on a host computer system in the storage area network. A file is identified for use in installing the agent. The file is signed to produce a digital signature for the file. A certificate is sent to a recipient for use in verifying authenticity of information. The file and digital signature are sent to the recipient. At the recipient, the certificate and the digital signature are used to verify the file. An agent installation operation is performed, using the file, to install the agent on the host computer system.

19 Claims, 9 Drawing Sheets

VERIFYING AUTHENTICITY IN DATA STORAGE MANAGEMENT SYSTEMS

BACKGROUND

The present invention relates generally to verifying authenticity, and more particularly to verifying authenticity in data storage management systems.

The need for high performance information technology systems is driven by several factors. In many industries, critical information technology applications require outstanding levels of service. At the same time, the world is experiencing an information explosion as more and more users demand timely access to a huge and steadily growing mass of data such as large databases or high quality multimedia content. The users also demand that information technology solutions protect data and perform securely.

Modern computer networks carry large amounts of data among many computer systems. This information is typically stored within high-capacity data storage systems that can be interconnected to form a computer network referred to as a storage area network. A typical storage area network includes host computer systems, typically referred to as servers, which connect through a switching fabric (e.g., one or more storage area network switches) to a group of data storage systems to gain access to the stored data on behalf of client computer systems (e.g., end user computers) that request the data. Users responsible for managing resources in the storage area network ("network managers") often use storage area network management software to manage the configuration and operation of resources such as host computer systems, switches, data storage systems, and associated software applications and hardware devices within the storage area network, and rely on such software to perform in a highly secure way.

SUMMARY

A storage area network management application operates using agents for management of resources. Authenticity is verified in installing an agent on a host computer system in the storage area network. A file is identified for use in installing the agent. The file is signed to produce a digital signature for the file. A certificate is sent to a recipient for use in verifying authenticity of information. The file and digital signature are sent to the recipient. At the recipient, the certificate and the digital signature are used to verify the file. An agent installation operation is performed, using the file, to install the agent on the host computer system.

One or more implementations of the invention may provide one or more of the following advantages. Network managers can install network management components out on the network in a highly secure way.

BRIEF DESCRIPTION OF THE DRAWINGS

The foregoing and other objects, features and advantages of the present application will be apparent from the following more particular description of preferred embodiments, as illustrated in the accompanying drawings in which like reference characters refer to the same parts throughout the different views. The drawings are not necessarily to scale, with emphasis instead being placed upon illustrating example embodiments, principles and concepts.

DETAILED DESCRIPTION

A storage area network management application, e.g., as described in connection with FIG. 1 below, provides a management server and a console program that provides a graphical user interface that allows users to graphically manage resources within a storage area network. The management server interacts with agent software processes ("agents") that execute on host computer systems operating within the storage area network to manage individual resources. The agents, which are part of the network management application, execute on the host computer systems to receive commands from the management server to configure and control the managed resources within the storage area network.

In the storage area network management application, different types of resources within the storage area network are managed by respective agents such as host agents for managing hosts, switch agents for managing switches, storage system agents for managing the data storage system, and agents for managing software applications (e.g., database agents). Each agent operates to collect periodically configuration data associated with resources managed by the agent for reporting back to the management server. Using the configuration data collected by the agents, the management server displays the current status and configuration of resources within the storage area network to a network manager on the graphical user interface of the console.

The network manager operates the management server to remotely install and configure the agents for operation on host computer systems in the storage area network. The installation process allows the network manager to identify a specific agent for installation on a specific host computer system within the storage area network. The network manager is guided by the installation process through the steps of installing the selected agent on the selected host. If the agent to be installed is replacing an agent already installed on that host (e.g., to provide a newer version of the agent), the installation process executes the replacement. Once the agent is properly installed, the network manager can cause the management server to instruct the newly installed agent to begin execution on the host.

The storage area network management application may include an agent installer as described in co-pending U.S. patent application Ser. No. 11/081,177 filed Mar. 6, 2005 entitled "METHODS AND APPARATUS FOR INSTALLING AGENTS IN A MANAGED NETWORK", which is assigned to the same assignee as the present application, and which is incorporated in its entirety herein by reference. The agent installer provides mechanisms and techniques for installing agents on host computer systems in an automated and bulk manner so that the network manager does not have to install each agent individually on each host using a separate manual installation process for each agent for each host.

In operation, configurations of the agent installer identify at least one agent to be installed on host computer systems. The identification of the agent to be installed on a group of computer systems can allow a user, for example, to select any number of host computer systems operating within the network. Based on a selection of the host computer systems, the agent installer is able to communicate with each of the host computer systems to identify the agents that are presently installed on those host computer systems. For example, if a user (e.g., a network manager) installs new agent code received from an agent vendor into a media repository associated with the storage area network management application (i.e., a media repository known to the agent installer), the user can operate the agent installer to select a group of hosts upon which that new agent code is to be installed. The agent installer communicates with a master agent on each host to determine the agent and the agent versions that are currently installed on those hosts. The master agent replies with a list of the agents installed as well as the version numbers of those agents. The agent installer then sorts the data received from the master agent from each host to determine, based on a comparison of the media repository agent versions that exist and the agents that are currently installed on each host machine, the agents that can be replaced ("patched") with the new agent. The agent installer produces a list, for each host, of the current version of agents installed on those hosts and the available patch version of those agents in the media repository. The user can then choose the hosts and agents on those hosts that should be upgraded or patched with the new agents.

Once the hosts and agents have been selected, the agent installer then performs prerequisite checking of each of the selected host computer systems to determine the host computer systems that are capable of supporting operation of the new agent(s). This can include performing, for example, cumulative pre-requisite disk space checking for each host to be patched with a new agent(s) to determine whether sufficient disk space exists on those hosts to deploy the new agent code. If prerequisite checking is successful, the agent installer provides a summary to the user and the user can confirm the installation to be performed.

The processing can be repeated in an automated manner for each host computer system that is capable of supporting operation of the agent. The system thus performs an automated bulk agent installation operation to install the agents on each host computer system and does not required further intervention by the user. During the installation process, an installation script provides detailed status of the installation back to the agent installer that is then displayed to the user who can then determine the current state of installation on many host computer systems.

The network management application may also include security features helping to secure communications between components of the network management application. As described below, the network application may include file authentication and signing functionality, which may be used, for example, in installing and managing components of the network management application.

Figure 1:
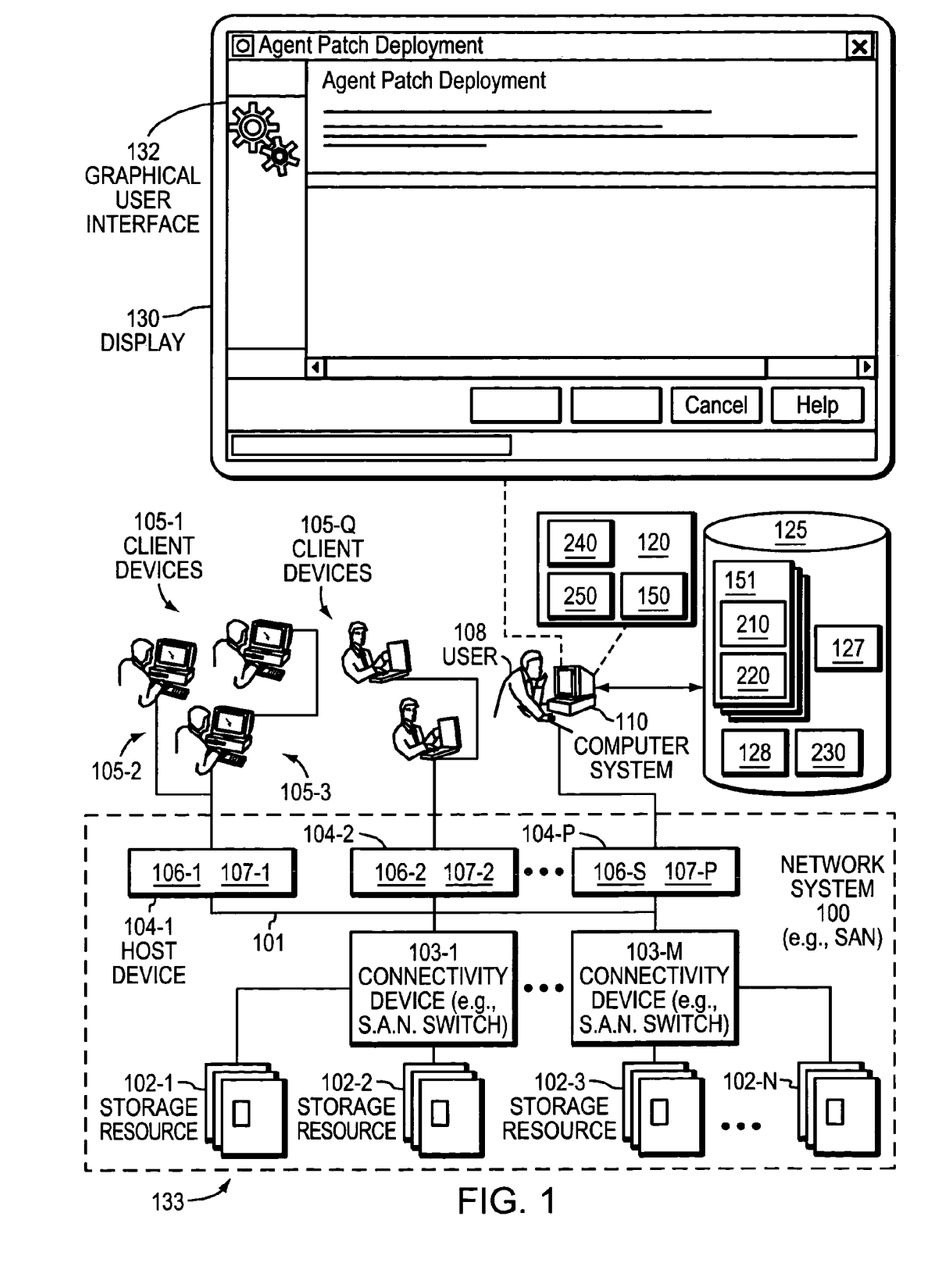
FIG. 1 is a pictorial diagram of a storage area network and corresponding management station configured to operate according to an embodiment of the present application.

FIG. 1 illustrates an example storage area network environment 133. As shown, a network system 100 such as a storage area network includes a network medium 101 such as a high-speed data communications medium (e.g., Ethernet, optical network, or other network) that interconnects such as storage resources 102-1, 102-2, . . . , 102-N (collectively, storage resources 102), network switches 103-1, . . . , 103-M (collectively, network switches 103 such as storage area network switches), host computer systems 104-1 (e.g., servers), 104-2, . . . , 104-P (collectively, host computer systems 104), client devices 105-1, 105-2, . . . , 105-Q (collectively, client devices 105), and a management computer system server 110 (e.g., a storage area network management station). Each host computer system in this storage area network example operates one or more agents 106-1 through 106-S and master agents 107-1 through 107-P. When installed and operational within the host computer systems 104, the agents 106 (of which a host may execute more than one) interact with the resources 102 through 104 to manage these resources under the control of a network management application 120 operating in the host computer system.

Server 110 operates (e.g., executes) the network management application 120 and further includes a display 130 and a media repository 125. The network management application 120 displays a graphical user interface 132 (e.g., a software graphical user interface application more particularly shown in FIG. 2) on the display 130 to generate and display information in connection with agent installation. The network management application is configured with an agent installer 150 that communicates with master agents 107-1 through 107-P as explained in the above-referenced co-assigned patent application to perform bulk installations/patches of agents 106 within the host computer systems 104. Server 110 further includes, or has access to, a media repository 125 that stores agents 151 (i.e., as agent installation packages with file authentication features as described below) that the agent installer 150 can install as agents 106 onto the host computer systems 104. In a sample embodiment, the media repository maintains third party software programs 127 that may be required on host computer systems 104 during operation of agents 151. Also in the sample embodiment, the media repository maintains pre-requisite checking scripts 128 that can perform pre-requisite checking of the host computer systems 104 prior to installation of the agent packages 151.

In the sample embodiment, server 110 is configured as a storage area network management station operated by a user 108 such as a network manager responsible that the user 108 uses for managing resources (e.g., 102 through 104) associated with the storage area network 100. The network management application 120 may be any type of network management software application that executes, performs, or otherwise operates within the management station computerized device server 110. Server 110 may include one or more other components such as one or more internal devices as well as software applications or processes (e.g., an operating system) that operate within or in conjunction with the illustrated components and devices in FIG. 1.

As shown in FIG. 1, the agent installer 150, operating in this example as part of the management application 120 on server 110, displays a graphical user interface 132 on the display 130 that allows the user 108 to provide input commands to control the process of performing bulk agent installations. Details of the operation of the agent installer 150 are shown in a more detailed view in FIG. 2.

Figure 2:
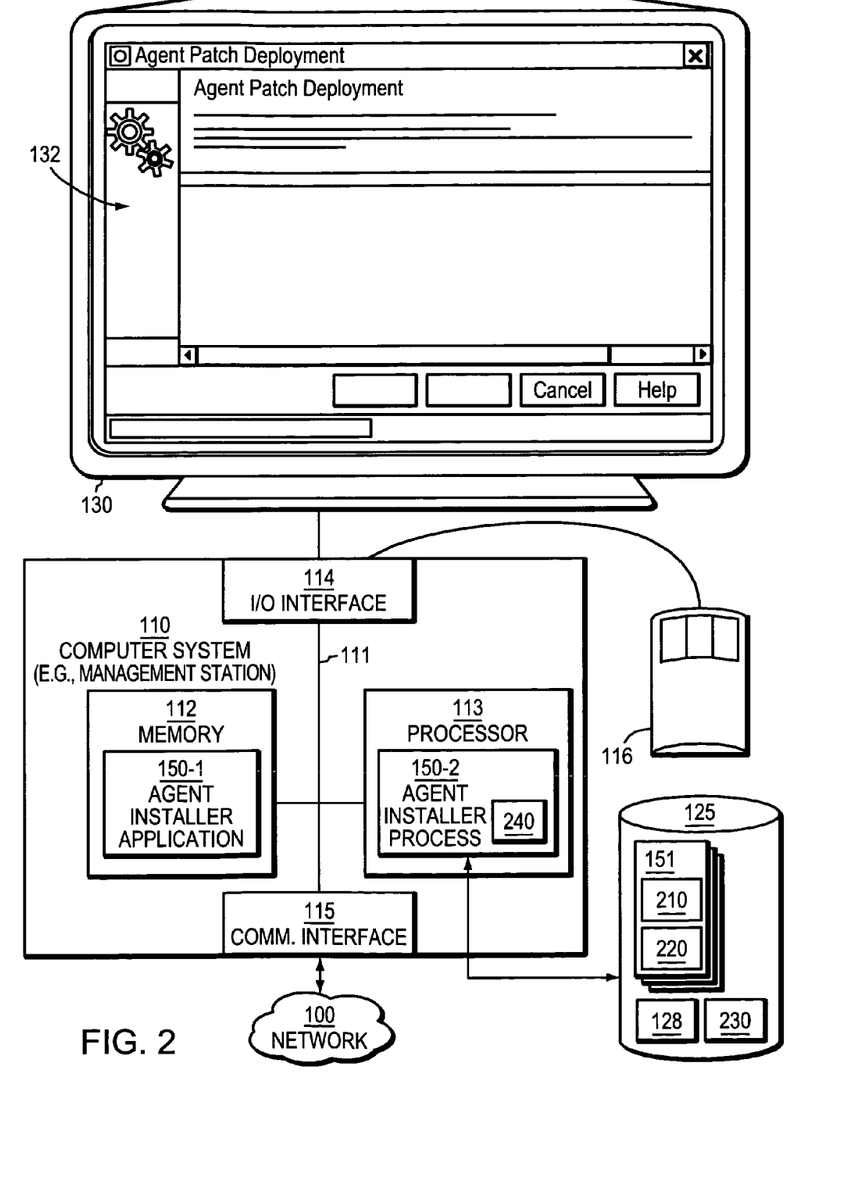
FIG. 2 is a block diagram of a sample architecture associated with the computer system management station for executing a resource manager application according to an embodiment of the present application.

FIG. 2 is a block diagram illustrating an example architecture of server 110, which may be any type of computerized device such as a personal computer, workstation, portable computing device, console, laptop computer, or network terminal. As shown, server 110 includes an interconnection mechanism 111 that couples a memory system 112, a processor 113, an input/output interface 114, and a communications interface 115. A peripheral device 116 (e.g., one or more viewer controlled devices such as a keyboard, mouse, etc.) couples to the processor 113 through the I/O interface 114 and enables the user 108 to provide input commands and thus generally control bulk agent installation operations and view installation status of the agent installer 150 on the graphical user interface 132. The media repository stores new agent installation packages 151, including files and signatures as described below, that can be used to install operating agents 106 onto the host computer systems 104. The media repository maintains third party software programs 127 that may be required on host computer systems 104 during operation of agents 151. The media repository also maintains pre-requisite checking scripts 128 that can perform pre-requisite checking of the host computer systems 104 prior to installation of the agent packages 151. The communications interface 115 enables the server 110 (and the corresponding user 108) to communicate with other devices (i.e., resources) associated with the network 100 which is a storage area network in this example.

As shown, the memory system 112 is encoded with a network management application that includes an agent installer 150 that supports bulk agent installation as described in the above referenced co-assigned patent application. The network management application may be embodied as software code such as data and/or logic instructions (e.g., code stored in the memory or on another computer readable medium such as a disk) that supports agent installer 150 processing functionality. During operation, the processor 113 accesses the memory system 112 via the interconnect 111 in order to launch, run, execute, interpret or otherwise perform the logic instructions of the network management application. Execution of the network management application produces a network management process that includes functionality of the agent installer 150. Thus the network management process including agent installer process 150-2, which includes transaction functionality 240 as described below, represents one or more portions of the network management application (or the entire application 120), including the agent installer application 150-1, performing within or upon the processor 113 in server 110. (In an alternative configuration, the agent installer application 150-1 and process 150-2 can be configured and operate separately from the network management application and process, such as a standalone agent installer 150.)

The network management manager 120 and the agent installer 150 executed in server 110 are represented in FIG. 2 by either one or both of application 150-1 and/or process 150-2. The network management application 120 and the agent installer 150 perform or support functional operations to carry out agent installation techniques. Example configurations herein include the agent installer 150 itself (i.e., the un-executed or non-performing logic instructions and/or data) which may be stored on a computer readable medium (such as a floppy disk), hard disk, or optical medium and may be part of or separate from the network management application 120. The agent installer 150 may also be stored in a computer readable medium such as the memory system 112 that may be firmware, read only memory (ROM), or, as in this example, as executable code in, for example, Random Access Memory (RAM). In addition to these embodiments, it should also be noted that other embodiments herein include the execution of the resource manager application in processor 113 as the resource manager process that each include the agent installer 150, or the agent installer 150 itself may exist as an application in memory 112 or as a process on the processor 113.

Thus, those skilled in the art will understand that server 110 may include other processes and/or software and hardware components, such as an operating system. The display 130 need not be coupled directly to server 110. For example, the network management application 120 can be executed on a remotely accessible computerized device. Further operational details of the network management application and process including the agent installer 150 are described in the above referenced co-assigned patent application.

FIGS. 1-2 also illustrate functional components used in file authentication and signing as described below. These components help provide security at, and in communications between, server 110 and master agents 107-1 through 107-P, and include one or more installation files 210, one or more digital signatures 220, one or more certificates 230, functionality providing a secure transaction 240, and functionality providing a file authenticator utility 250.

File authentication and signing relies on well known public-key cryptography principles, according to which an entity (e.g., here, server 110) has a public key that can be published, and a private key that is known only to the entity. Data encrypted by the public key can be decrypted only by the private key, and vice versa, but not by any other means.

Another well known concept is a message digest which is a small representation of a long message that is obtained by applying a one-way hash function to the long message such that, computationally, it is nearly impossible to find two long messages that have the same message digest. If the message digest is sent together with the long message, the recipient can compute a new message digest from the received long message and compare it with the received message digest to determine whether the received long message is valid.

A related well known concept is a digital signature, which is the result of encrypting ("signing") a message digest with the sender's private key. Since only the sender knows the private key, the recipient (e.g., here, master agent 107) can operate reliably on the basis that the message digest, and therefore the long message, was indeed provided by the purported sender (e.g., here, server 110).

A certificate is another well known related concept and forms the basis of authentication. The certificate is data in a well-defined format that binds an entity's identity to its public key and is signed by a trusted authority. If the entity itself serves as the trusted authority, the certificate is a self-signed certificate. The certificate can also include other information such as an expiration period including an expiration date.

Thus, for example, server 110 can produce a self-signed certificate by creating a message digest from a collection of information that includes the server's public key and an identification of the system, encrypting the message digest using the server's private key, and providing the encrypted message digest together with the collection of information. After being provided with the certificate, master agent 107 can then use the public key from the certificate to authenticate files of agent installation packages 151 received from the server.

Figure 3:
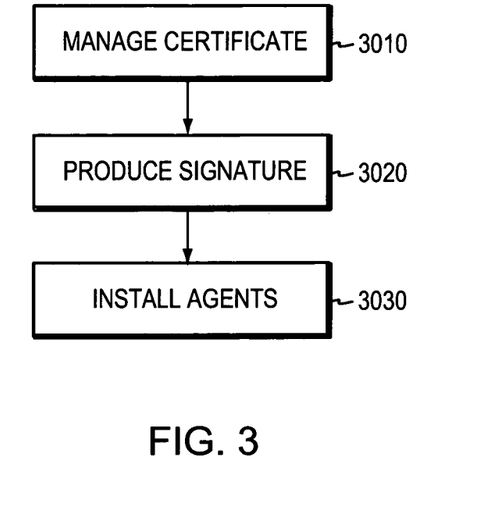
FIGS. 3-8 are flow charts of processing steps that may be executed in the storage area network of FIGS. 1-2.

FIG. 3 is a high level flow chart illustrating file authentication and signing in the course of installing agents in general accordance with the methods and system described in the above referenced co-assigned patent application. Certificate 230 is managed, which management may include generation of the certificate (e.g., at server 110 or elsewhere) and providing (e.g., by transmission from the server or elsewhere) of a copy of the certificate to master agent 107 (step 3010). Signatures 220 for files 210 are produced, e.g., at server 110, in connection with the certificate, for use in agent installation packages 151 (step 3020). Agents 106 are installed using one or more of files 210 which are authenticated, e.g., after receipt by master agent 107 (step 3030).

Agent installation requires sending files, in packages 151, from server 110 to master agent 107. Types of files sent in the course of agent installation include a script and a set of files collected into a single archive file. After master agent 107 receives the files, master agent 107 runs the script. File authentication and signing helps prevent unauthorized replacement of the files en route to master agent 107.

Figure 4:
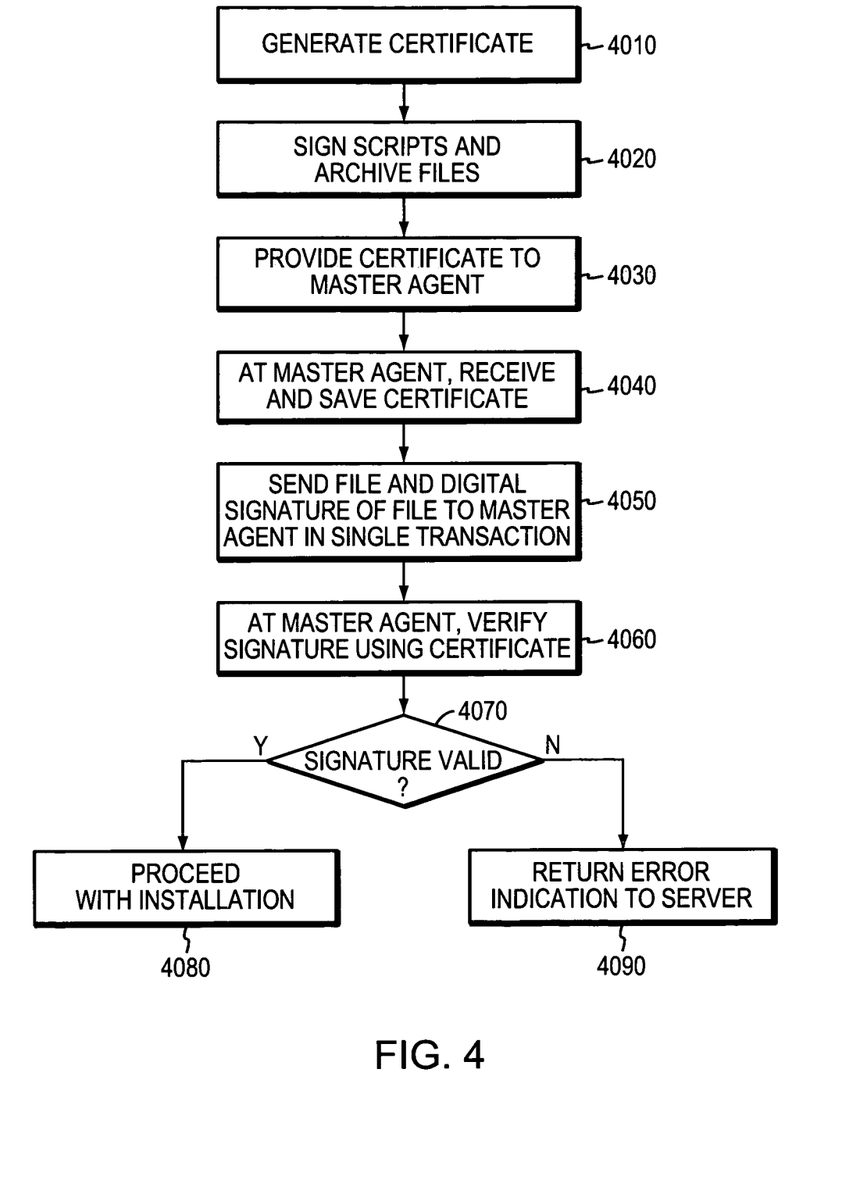

In a specific sample embodiment as described below, the files are authenticated using digital signatures. FIG. 4 illustrates a flow chart of steps executed in the sample embodiment. In particular, a certificate is used and every file to be sent in installations is digitally signed. In sample embodiments, the certificate may be signed by a specified signing authority or may be self-signed. The certificate may be generated (step 4010) at a separate, centralized location (e.g., at a software publisher), or at the server when the management system is first installed or in the course of enhancing an existing system by providing file authentication and signing. In the event the certificate is generated at the separate, centralized location, the private key may be retained at the centralized location and may not be installed at the server. In the sample embodiment, digital signing relies on RSA (Rivest-Shamir-Adleman) key methodology with default key length of 2048 bits and an SHA1 hash method for signatures.

Scripts and collection files are signed (step 4020), e.g., at the centralized location before the management system is installed, or once when the management system is first installed or in the course of enhancing an existing system, such as in connection with installing software such as EMC Solution Enabler. In the sample embodiment, the signatures and files are saved at the same location, e.g., in repository 125.

The certificate is provided at the master agent's location, e.g., by CD-ROM or by being sent securely to the master agent on master agent startup (step 4030), and the master agent accepts and saves the certificate (step 4040).

In the sample embodiment, which may be implemented in a system 133 as described above and in the above referenced co-assigned patent application, functionality 240 referred to as a secure transaction is provided. The secure transaction allows the server to send a file and the digital signature of the file to the master agent in a single transaction (step 4050).

After receiving the file and its signature, the master agent verifies the signature using the certificate (step 4060). If the signature is valid (step 4070), the master agent proceeds with the installation (step 4080). Otherwise the master agent returns an error indication to the server (step 4090).

Now described in more detail is certificate management which may include certificate generation, certificate distribution, and certificate replacement. In the sample embodiment, utility 250 is a stand-alone Java application and is used for certificate management and signing files.

Certificate Generation

With respect to certificate generation (FIG. 5), a unique identifier ("Id") is assigned for each certificate (step 5010). Utility 250 generates the certificate (e.g., signed by a signing authority or self-signed) and a private key (step 5020), e.g., at the centralized location or at the server when the management system is first installed or in the course of enhancing an existing system. In the sample embodiment, utility 250 is executed with arguments specifying certificate generation, the required key length in bits (e.g., 2048), and an expiration period.

Figure 5:
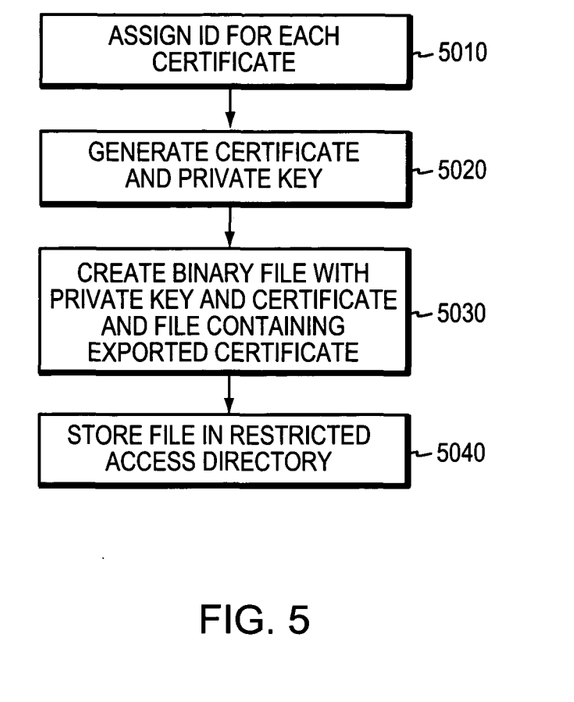

Two files are created (step 5030): a binary file with a private key and certificate, and a file containing the certificate exported into printable base-64 encoding format.

With respect to types of users with access rights to the files, both files are stored in a directory (step 5040) that allows full access for Administrator type, Creator owner type, and System type, but allows no access for Network type. The directory may be, include, or be included in, repository 125.

In the sample embodiment, the certificate is generated only once at the centralized location, or at the server when the management system is first installed or in the course of enhancing an existing system. In the event the certificate needs to be replaced a replacement procedure (described below) is executed.

Certificate Distribution

With respect to certificate distribution (FIG. 6), in an embodiment in which a certificate is not pre-installed with the master agent (e.g., by CD-ROM) and is not stored in a centralized location, server 110 has a unique generated certificate that it sends securely to a master agent as discussed above. (Other servers have their own respective unique generated certificates.) The server attempts to validate the certificate on its startup (step 6010), including by checking the expiration date. In particular, the server checks that the current date is not later than the expiration date and not before the certificate expiration period (step 6020). If the validation fails, the server disables remote install functionality and outputs a warning message, e.g., "Failed verifying install certificate" (step 6040).

Figure 6:
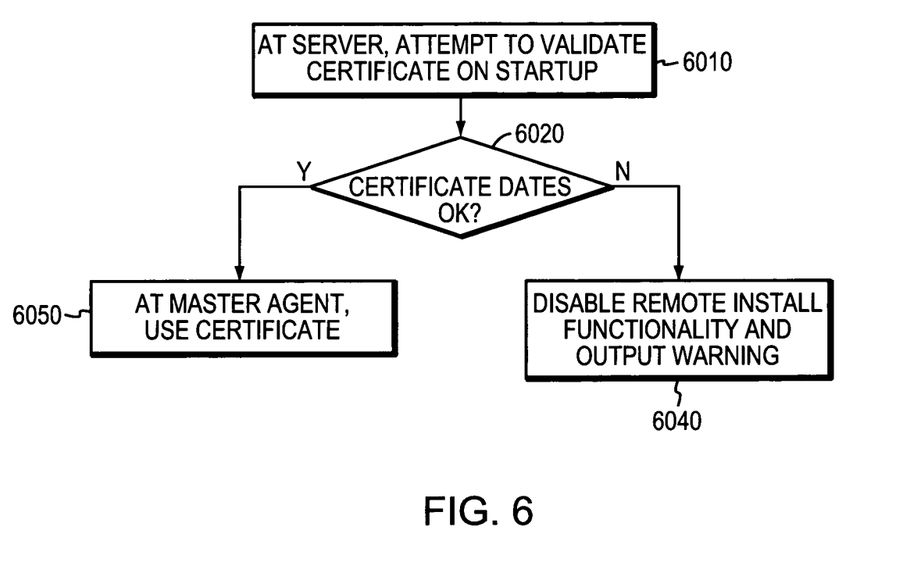

Master agent 107 uses the certificate that it receives from server 110 or that is pre-installed (step 6050).

When master agent 107 starts up, it executes a procedure (FIG. 7) that can lead to the master agent receiving a certificate from the server if needed.

Figure 7A:
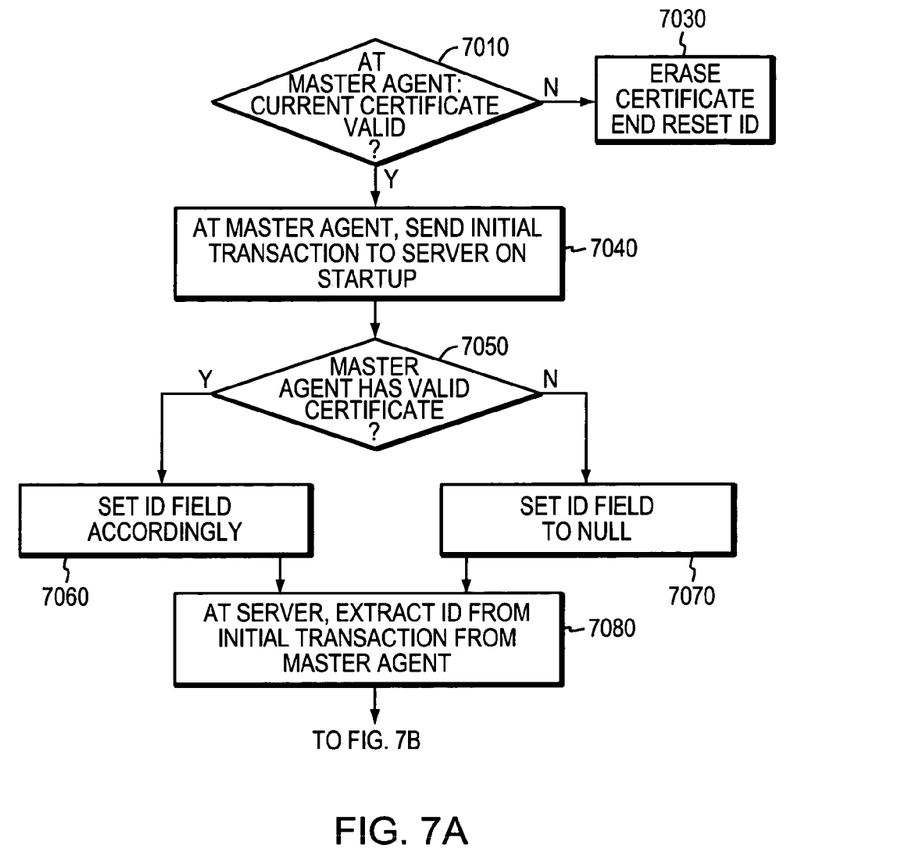
Figure 7B:
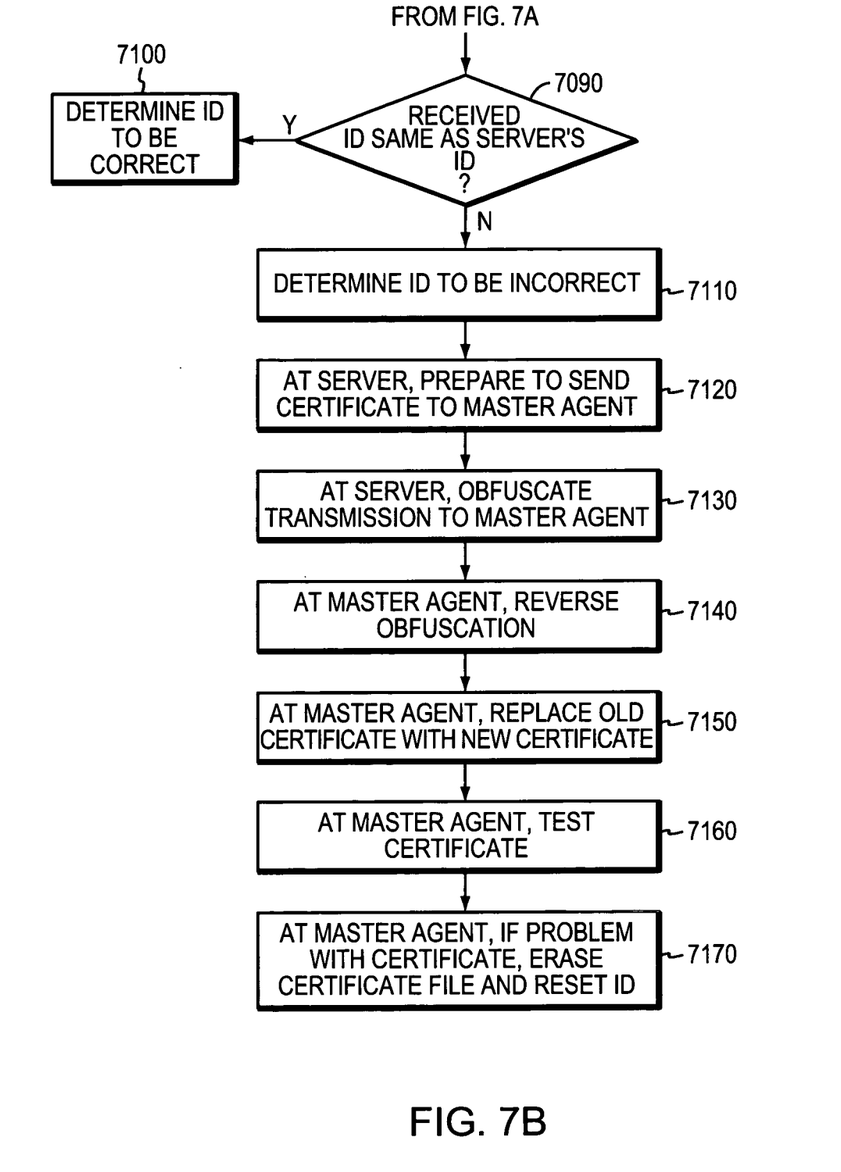

Upon startup, the master agent attempts to validate its current certificate, if any (step 7010). In particular, the master agent attempts to load it and verify the expiration date. When the master agent verifies the expiration date it checks that the current time is not later than the certificate expiration date. In addition, the master agent does not validate if the current time precedes the start of the certificate expiration period. If the master agent fails to load the certificate or the certificate is expired, the master agent erases the certificate and resets its current certificate Id (step 7030).

As noted above, master agent 107 sends an initial transaction to server 110 on its startup (step 7040). The transaction includes an Id field for use in transmitting the current certificate Id that is in the master agent's possession.

If the master agent has a valid certificate (step 7050), it sets the value of the Id field accordingly (step 7060). If certificate validation has failed, the master agent sets the value of the Id field to null (step 7070). In the sample embodiment, an agent 106 always set the certificate Id value to null.

When the server receives the initial transaction from the master agent it extracts the certificate Id from the initial transaction (step 7080). If the received certificate Id is the same as the server's certificate Id (step 7090), it is determined to be correct (step 7100). The certificate Id is determined to be incorrect otherwise (step 7110), e.g., if it amounts to an empty string or is different from the server's certificate Id.

The server prepares to send the certificate in an acknowledgement response to the master agent only if the certificate Id received from the master agent is incorrect (step 7120).

Certificate management includes handling at least the following five scenarios:

1. The master agent starts out having no certificate. The master agent sends an initial transaction with an empty certificate Id field and receives a response with a certificate. The master agent successfully validates the certificate and keeps it.

2. The master agent starts having no certificate. The master agent sends an initial transaction with an empty certificate Id field and receives a response with no certificate. In this case the master agent has no certificate and every install attempt fails. This scenario can arise when there is a certificate problem on the server side. The master agent receives a valid certificate only after the master agent is restarted after the problem is fixed on the server.

3. The master agent starts with a certificate from a previous execution. It sends the certificate Id in the initial transaction and gets back a new certificate. The master agent successfully verifies the new certificate and keeps it. The master agent erases the old certificate.

4. The master agent starts with a certificate from a previous execution. It sends the certificate Id in the initial transaction and gets back a new certificate, but fails to verify the new certificate. The master agent does not keep the new certificate, and erases the old certificate. In this case the master agent has no certificate, and every install attempt sent to the master agent fails. The master agent may receive a valid certificate only after the master agent is restarted.

5. The master agent starts with a certificate from a previous execution. It sends the certificate Id in the initial transaction and gets back an empty certificate. The master agent does nothing and continues using its old certificate. This scenario may arise because the master agent is in sync with the server and there is no need to send a new certificate. Alternatively, the server may be experiencing a certificate problem, in which case the master agent will not receive any install requests from the server until the problem is fixed and the server is restarted. In particular, the problem might be fixed by correcting the server environment. In this case the master agent continues working with restarted server. In at least some cases the problem may be fixed by replacing the certificate on the server side and causing re-signing of the media repository. If so, every install request coming from the restarted server would fail, and the master agent would need to be restarted in order to obtain the new certificate from the server.

If the server is to send a certificate Id to the master agent the server reads the certificate from the certificate file.

In the sample embodiment, the server encrypts or otherwise obfuscates the entire structure above and includes the result in the initial response (step 7130).

The master agent reverses the obfuscation of the last token (step 7140), parses the certificate Id and the certificate and recreates the certificate file.

The master agent performs an initial test on the certificate file to ensure that the format is correct, and further tests successfully loading it and verifying the expiration date (step 7160).

The master agent replaces the old certificate with the new certificate received from the server (step 7150). The Id of the new certificate replaces the previous certificate Id. The location of the certificate is the above described directory that is protected against unauthorized network users. The certificate is not included in an agent's clone if a clone of the agent is created.

If there is any problem with the received certificate, the master agent erases the certificate file, resets the certificate Id, and shuts down (step 7170). An error message (e.g., "Validation of received certificate failed") is added to the master agent's log file. If the master agent has no certificate at all and expects a certificate from the server in the initial reply but receives an empty field, the master agent shuts down and a suitable error message (e.g., "Did not receive expected extra data in initial reply") is added to the master agent log file. In the sample embodiment, the master agent does not restart automatically, and is restarted by a user.

On the next startup, the master agent has no certificate Id to send to the server, and sends an empty certificate Id in the initial transaction to prompt the server to resend the certificate.

Certificate Replacement

With respect to certificate replacement, if needed, the following procedure is executed.

At the server, a new certificate is generated or replaced using utility 250 noted above.

The new certificate replaces the old certificate in the secure location at repository 125 at the server.

All files that are signed at the management system installation time are re-signed as described below, or new signed files are installed if the certificate is generated at a centralized location.

All master agents are restarted. Master agents receive the new certificate on startup. If a master agent does not restart, it fails with every future installation of any agent.

Signing Files

As now described in more detail, signing files may include signing scripts and archive files, as described below.

In the sample embodiment, all files that are brought to a master agent during an agent installation are digitally signed. With respect to the types of files that are involved in installations, scripts and archive files are included in the installation data (e.g., on a compact disc) and can be signed once during the management system installation, or at a centralized location as described above, for all future uses.

With respect to signing scripts and archive files, utility 250 signs the scripts and archive files when the management system is first installed or in the course of enhancing an existing system, or at a centralized location as described above.

Utility 250 reads the file and generates a digital signature for each archive or script file in an appropriate (e.g., media repository) folder using the server's private key. The signatures' files are saved with the original files.

In the event of an upgrade of the media repository, when the media repository is changed, the updated or new scripts and archive files are signed or signature files installed for signatures to reflect the changes. Utility 250 is executed with an appropriate argument for updated or new files.

Prerequisite Checking

At server startup, an installation plugin is loaded and executed. The plugin checks that every script and archive file in the media repository has a signature. If one or more of the files has no signature, the plugin disables installation of the agent.

A call for every script and archive file in the media repository is made to a method of utility 250 and specifies the name of the file to be signed. The method also checks whether the file is signed using the server certificate.

Sending Signed Files

With respect to sending a signed file to a master agent (FIG. 8), for every file (script or archive) that the server sends to a master agent it includes the signature of the file in the transaction. It uses utility 250 to get the existing signature of a script or archive file (step 8010).

Figure 8:
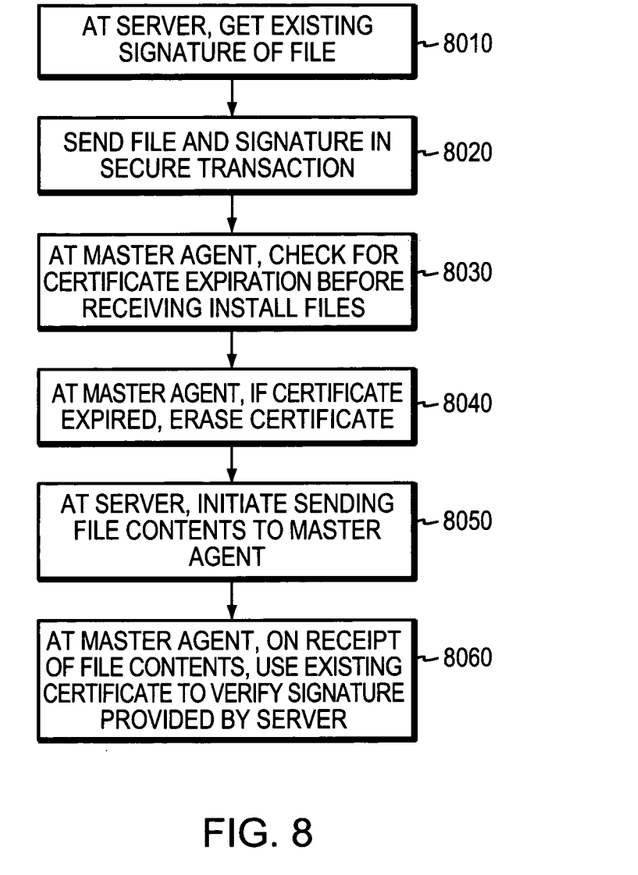

Both the file and the digital signature are sent in the above-referenced secure transaction (step 8020).

The master agent checks for certificate expiration during the installation before it receives the install files (step 8030). If the certificate is expired the master agent erases the certificate (step 8040), and the master agent replies with NAK to the server's secure transaction, and produces an error message (e.g., "Unable to verify signature of file: certificate on host is invalid or expired"). Thus every subsequent agent install fails, and the master agent needs to be restarted by a user to receive the new certificate from the server.

In the sample embodiment, the secure transaction may execute entirely over the same TCP socket (i.e., the same handle to a communications link over the network).

The server starts the transaction specifying the name of the file to be sent, the file size (the length of the file on the server disk), and the file signature to be used to validate the content of the received file. In the sample embodiment, signature is used in decryption to validate the content of the file.

An acknowledgement is provided from the master agent to accept the file.

Upon receipt of the file name, size, and signature the master agent acknowledges by sending a header followed by a payload having ACK or NAK and an error message text (in the case of a NAK). If the Master Agent fails to parse the signature (e.g., in the case of an empty signature), or determines any other parsing error on the signature, the error message returned is: "INVALID SIGNATURE format for file filename" (filename being the name of the received file).

The server initiates sending the file contents to the master agent (step 8050) using the secure transaction.

Upon receipt of an acknowledgement (ACK) from the master agent, the server sends the file contents in the payload. In the sample embodiment, the payload is sent in 32 k portions.

Upon receipt of the file contents, the master agent uses its existing certificate to verify the signature provided by the server (step 8060). Together with every signature validation the master agent verifies the expiration date of the certificate. The master agent acknowledges by sending a header followed by a payload having ACK or NAK and an error message text (in the case of a NAK).

If the master agent fails to validate the file signature, the error message returned is "Signature verification failed for file filename" (filename being the name of the received file)

If the master agent finds that the certificate is expired, the error message returned is "Certificate is expired. Signature verification failed for file filename" (filename being the name of the received file).

Signing Utility

In the sample embodiment, utility 250 may be used as follows if an install (e.g., archive) file in the media repository is not signed.

Files in the Media Repository are signed by running utility 250 with a signing argument, and if a file is also specified, the utility digitally signs the file specified. If a directory name is specified, the utility signs all files in the directory filtered by extensions. If recursion parameter follows the signing argument, the utility recursively signs all files in the directory and its subdirectories filtered by extensions.

In at least one embodiment, some information may be signed on the fly, i.e., after agent installation has already begun. For example, information that is created with user interaction at an agent install time may be signed on the fly when the install transaction is sent.

It is to be understood that the functionality described above may be embodied solely as a software program, or as a software program operating in conjunction with corresponding hardware. For example, embodiments may be implemented in EMC's Control Center (ECC) software application that provides graphical management functionality of storage area network resources. Embodiments may also be implemented in computer devices that operate the Control Center (ECC) software. Control Center software is manufactured by EMC Corporation of Hopkinton, Mass., USA.

Other examples of the configurations disclosed herein include a computer system (e.g., a host computer, workstation, etc.) configured to support the functionality disclosed herein. In such embodiments, the computer system includes a display, a memory system, a processor (e.g., a processing device) and an interconnect. The interconnect supports communications among the display, the processor and the memory system. The memory system is encoded with file authentication and signing software that, when executed on the processor, produces processes supporting the embodiments and functionality discussed above and disclosed elsewhere herein.

Yet other embodiments of the present application disclosed herein include software programs to perform the methods and operations summarized above and disclosed in detail below under the heading Detailed Description. More particularly, a computer program product (e.g., a computer-readable medium) including computer program logic encoded thereon may be executed on a computer device to support agent installation server and host operations as explained herein. The computer program logic, when executed on at least one processor of a corresponding computing system, causes the processor to perform the operations (e.g., the methods) indicated herein as embodiments of the present application. Such arrangements of the present application are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed on a computer device to cause one or more processors in the computerized device to perform the techniques explained herein. Software processes that operate in a collection of computer devices, such as in a group of storage area network management servers or hosts or management stations can also support embodiments of the present application.

What is claimed is:

1. In a storage area network management application that operates using agents for management of resources, a method for use in verifying authenticity in installing an agent on a host computer system in the storage area network, the method comprising:

identifying a file for use in installing the agent, wherein an agent installer identifies the agent for installation on the host computer system, wherein the agent collects and reports data within the storage area network, wherein the agent installer receives a list of installed agents and a list of agent versions from a master agent;

signing the file to produce a digital signature for the file;

providing, to a recipient, a certificate for use in verifying authenticity of information, wherein the recipient includes the master agent having the list of installed agents and the list of agent versions, wherein the master agent saves the certificate;

sending the file and digital signature to the recipient in a single secure transaction;

at the recipient, using the certificate and the digital signature to verify the file, wherein the master agent verifies the digital signature using the certificate; and using the file, performing an agent installation operation to install the agent on the host computer system, wherein the host computer system connects to at least one data storage system to gain access to stored data on behalf of client computer systems requesting the stored data.

2. The method of claim 1, further comprising:

providing the certificate to the recipient from a centralized location.

3. The method of claim 1, further comprising:

providing the certificate to the recipient from an agent installation server.

4. The method of claim 3, further comprising:

at the agent installation server, creating an obfuscated version of the certificate to send to the recipient.

5. The method of claim 1, wherein the file includes a script file.

6. The method of claim 5, further comprising:
executing the script file in the agent installation operation.

7. The method of claim 1, wherein the file includes an archive file.

8. The method of claim 1, further comprising:
validating the certificate at an agent installation server.

9. The method of claim 1, further comprising:
validating the certificate at the recipient.

10. The method of claim 1, further comprising:
storing the certificate in a limited access location.

11. The method of claim 1, further comprising:
storing the digital signature in a limited access location.

12. The method of claim 1, further comprising:
using RSA methodology, an SHA™ hashing method, and a 2048 bit key length to produce the digital signature.

13. In a storage area network management application that operates using agents for management of resources, a method for use in verifying authenticity in installing an agent on a host computer system in the storage area network, the method comprising:
identifying a file for use in installing the agent, wherein an agent installer identifies the agent for installation on the host computer system, wherein the agent collects and reports data within the storage area network, wherein the agent installer receives a list of installed agents and a list of agent versions from a master agent;
signing the file to produce a digital signature for the file;
storing the digital signature together with the file in a limited access location;
sending the file and digital signature to a recipient in a single secure transaction, wherein the recipient includes the master agent having the list of installed agents and the list of agent versions;
at the recipient, using the digital signature to verify the file, wherein the master agent verifies the digital signature; and
using the file, performing an agent installation operation to install the agent on the host computer system, wherein the host computer system connects to at least one data storage system to gain access to stored data on behalf of client computer systems requesting the stored data.

14. The method of claim 13, further comprising:
providing a certificate to the recipient from a centralized location.

15. The method of claim 13, further comprising:
providing a certificate to the recipient from an agent installation server.

16. The method of claim 13, wherein the file includes a script file.

17. The method of claim 16, further comprising:
executing the script file in the agent installation operation.

18. A computer system comprising:
a memory;
a processor;
a communications interface;
an interconnection mechanism coupling the memory, the processor and the communications interface;
wherein the memory is encoded with instructions that when executed on the processor help cause the computer system to verify authenticity in installing an agent by performing the operations of:
identifying a file for use in installing the agent, wherein an agent installer identifies the agent for installation on the host computer system, wherein the agent collects and reports data within the storage area network, wherein the agent installer receives a list of installed agents and a list of agent versions from a master agent, wherein the storage area network comprises a host computer system connecting to at least one data storage system to gain access to stored data on behalf of client computer systems requesting the stored data;
signing the file to produce a digital signature for the file;
sending, to a recipient, a certificate for use in verifying authenticity of information, wherein the recipient includes the master agent having the list of installed agents and the list of agent versions, wherein the master agent saves the certificate;
sending the file and digital signature to the recipient in a single secure transaction; and
at the recipient, using the certificate and the digital signature to verify the file, wherein the master agent verifies the digital signature using the certificate.

19. The computer system of claim 18, wherein the memory is encoded with instructions that when executed on the processor help cause the computer system to verify authenticity in installing an agent by performing the operation of providing the certificate to the recipient from an agent installation server.

* * * * *